United States Patent
Hartsell

(10) Patent No.: US 7,100,536 B2
(45) Date of Patent: *Sep. 5, 2006

(54) FOWL RETENTION AND TERRITORY COMPRESSION SYSTEM

(76) Inventor: Cliff Hartsell, 141 Weeping Willow, Uvalde, TX (US) 78801

( * ) Notice: Subject to any disclaimer, the term of this patent is extended or adjusted under 35 U.S.C. 154(b) by 0 days.

This patent is subject to a terminal disclaimer.

(21) Appl. No.: 10/772,702

(22) Filed: Feb. 5, 2004

(65) Prior Publication Data

US 2005/0172906 A1    Aug. 11, 2005

Related U.S. Application Data

(60) Provisional application No. 60/651,461, filed on Jun. 25, 2003.

(51) Int. Cl.
- A01K 31/14 (2006.01)
- A01K 7/00 (2006.01)
- A01K 61/02 (2006.01)

(52) U.S. Cl. .......................... 119/346; 119/329; 119/74; 119/78; 119/51.01; 119/57.8

(58) Field of Classification Search ................ 119/346, 119/329, 70, 74, 78, 51.01, 52.1, 52.4, 57.8, 119/57.9; 43/1; 135/124–138, 901, 906, 135/100, 115; 52/DIG. 11–12, 3

See application file for complete search history.

(56) References Cited

U.S. PATENT DOCUMENTS

| | | | |
|---|---|---|---|
| 684,086 A * | 10/1901 | McCall | 135/125 |
| 1,975,866 A * | 10/1934 | Rackstraw | 119/303 |
| 2,302,650 A * | 11/1942 | Anderson et al. | 135/130 |
| 2,349,993 A * | 5/1944 | Schwimmer et al. | 135/97 |
| 2,355,008 A * | 8/1944 | Moran | 135/97 |
| 2,618,237 A * | 11/1952 | McDermott et al. | 119/454 |
| 2,879,553 A * | 3/1959 | Keating | 135/126 |
| 3,017,858 A * | 1/1962 | Brown | 119/428 |
| 3,717,126 A * | 2/1973 | Falcone et al. | 119/52.4 |
| 3,901,192 A * | 8/1975 | Adams | 119/57.9 |
| 3,902,460 A * | 9/1975 | Franklin | 119/52.3 |

(Continued)

FOREIGN PATENT DOCUMENTS

DE    4114415 A1 * 11/1992

OTHER PUBLICATIONS

Bobwhite Quail Management, by H. Lee Stribling, Extension Wildlife Scientist, Auburn University, http://www.pointingdogs.com/LM/Quail+Management.htm, Dec. 24, 2002 [retrieved from internet Feb. 15, 2005]. 5 pages.*

Management for Bobwhite Quail, By Charles W. Ramsey, Extension Wildlife Specialist, The Texas A&M University System, http://wildlife.tamu.edu/publications/A071.pdf, Dec. 22, 2003 [retrieved from internet Feb. 15, 2005] 4 pages.*

(Continued)

*Primary Examiner*—Andrew M. Valenti
(74) *Attorney, Agent, or Firm*—Christopher L. Makay

(57) ABSTRACT

A fowl retention system is used to passively retain fowl in a preselected natural habitat or a preselected created habitat and to compress the fowl territory. The fowl retention system includes a food/water station contained within a barrier assembly, a protective structure, and a man-made field strip. The fowl retention system provides for the compression of fowl territories, thereby increasing the fowl population per unit area. Further compression of the fowl territory locations provides an additional level of compression by propagating the high density population of the fowl. The protective structure is designed to shield the fowl from the elements and predators. The field strip is planted with native vegetation for both cover and the production of food. The food and water station provides a continuous food and water supply for the fowl.

20 Claims, 8 Drawing Sheets

U.S. PATENT DOCUMENTS

| | | | | |
|---|---|---|---|---|
| 4,074,682 A | * | 2/1978 | Yoon | 135/135 |
| 4,144,842 A | * | 3/1979 | Schlising | 119/52.3 |
| 4,628,865 A | * | 12/1986 | Lehmann | 119/57.9 |
| 4,982,702 A | * | 1/1991 | Copps | 119/69.5 |
| 5,285,804 A | * | 2/1994 | Gretzmacher | 135/125 |
| 5,924,380 A | * | 7/1999 | Rayborn | 119/51.5 |
| 6,318,290 B1 | * | 11/2001 | Fisher | 119/51.5 |
| 6,612,257 B1 | * | 9/2003 | George | 119/57.9 |
| 2002/0069904 A1 | * | 6/2002 | Robinson | 135/87 |
| 2004/0221817 A1 | * | 11/2004 | Hatfield | 119/74 |

OTHER PUBLICATIONS

Woodland Fish and Wildlife, Quail on Small Woodlands, published Jul. 1996, http://www.dfw.state.or.us/public/woodlandarc/quail.pdf [retrieved from internet Feb. 15, 2005] 8 pages.*

Walnut Creek Open Space Foundation, Quail Habitat Project, http://www.wcosf.org/activities/quail_habitat.shtml, Dec. 17, 2003 [retrieved from internet Feb. 15, 2005] 4 pages.*

Kosciuk, James R. and Peloquin, E. Paul. 1986. "Elevated Quail Roosts: Section 5.1.5, US Army Corps of Engineers Wildlife Resources Management Manual," Technical Report EL-86-18, Jul. 1986, 19 pages total including title pages and abstract.*

* cited by examiner

FOWL RETENTION AND TERRITORY COMPRESSION SYSTEM

RELATED APPLICATION

The present application claims all available benefit, under 35 U.S.C. 119(e), of U.S. provisional patent application Ser. No. 60/651,461, filed Jun. 25, 2003, and U.S. patent application Ser. No. 10/738,236, filed Dec. 17, 2003. By this reference, the full disclosures of U.S. provisional patent application Ser. No. 60/651,461 and U.S. patent application Ser. No. 10/738,236 are incorporated herein as though now set forth in its entirety.

BACKGROUND OF THE INVENTION

1. Field of the Invention

The present invention relates to retaining fowl and, more particularly, but not by way of limitation, to the retention of fowl in a natural environment.

2. Background of the Invention

In the bird hunting industry, the production and retention of birds in a predetermined location is key to the continuing success of hunters, as well as to the success of the operators of a hunting establishment. Many hunters return to proven hunting grounds or establishments, on at least an annual basis. The continued operation of the hunting establishment is directly tied to the ability of the hunting establishment to retain fowl in a prescribed area. Those operations that excel at the retention of the fowl will have increased quantities of the fowl for harvest, as well as increased chances for reproduction of the fowl at the preselected location.

As fowl in a natural setting are able to fly, those involved in retaining the fowl must provide all of the necessary elements of the fowl habitat. Retention of the fowl is largely dependent upon the proper habitat, and the availability of food and water sources within the local environment. In a natural setting, non-migratory fowl are territorial. As such, proper habitats must be established to provide each province with all required aspects of the fowl habitat. If an appropriate habitat is not available in the immediate area, the fowl will move to a more correct habitat. Challenges arise when multiple habitats must be created in controlled areas or on tracts of land that are not naturally conducive to the desired type of fowl. Variations of topography within a specific plat of land can also present problems, as sections of the site may include suitable habitats and other sections may be unsuitable for the fowl.

Further complications arise when a large number of territories are established on acreage with preexisting boundaries, as the territories may be too close together. Alternatively, if the territories are separated by great distances, frequent visits to a large number of territories to properly feed and ensure proper water supplies can prove to be overwhelming. The operators of the hunting establishments must continually be able to provide food and water to the territories. The distribution of small quantities of food product is not optimal, as the operators will continually be required to provide feed and water on a high-frequency rate. However, the distribution of food in large quantities is not feasible if unprotected, as other native animals will likely consume any unprotected food product.

Accordingly, a fowl retention system that promotes the propagation and retention of fowl in a natural environment would be beneficial to operators of hunting establishments, as well as those raising large quantities of fowl.

SUMMARY OF THE INVENTION

In accordance with the present invention, a fowl retention system is used to retain fowl in a preselected natural habitat or a preselected created habitat and compress a fowl territory to increase a fowl population per unit area. The fowl retention system includes a food/water station contained within a barrier assembly, a protective structure, and a man-made habitat strip. The protective structure is designed to shield the fowl from the elements and predators. The habitat strip is planted with native vegetation for cover, nesting, and the production of food. The food and water station provides a supplemental food supply and a substantially continuous water supply for the fowl. The feeding device includes a reserve supply of food product to last substantially a month. The feeding device design also prevents large animals from consuming large quantities of the food product, as well as insects, typically ants, from removing the stored food product. The water supply device ensures that the fowl have adequate water, and must be refilled substantially every six months.

The invention ensures that all needs of the fowl are taken into consideration, thereby providing the ability to establish compressed fowl territories within the boundaries of a specific location. The invention further provides for compressing the distances between fowl territories, thereby increasing the fowl population in a given area. Propagation of increased populations of fowl leads to increased harvests of the fowl. It is therefore an object of the present invention to provide a system for retaining fowl in a preselected natural environment, as well as newly established colonies.

It is a further object of the present invention to provide a compressed fowl territory in a natural environment.

It is still further an object of the present invention to provide increased fowl populations per unit area by compressing the locations of the fowl territories.

It is still yet further an object of the present invention to provide a natural habitat strip for use by the fowl population in nesting, cover, and the gathering of food items.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

A fowl retention system is used to passively retain fowl in a preselected natural habitat or a preselected created habitat. The fowl retention system includes a food/water station, a protective structure, and a man-made field strip. The protective structure is designed to shield the fowl from the elements and predators. The man-made field strip is planted with native vegetation for both cover and the production of a primary food source for the fowl. The food and water station provides a continuous food and water supply for consumption by the fowl. The feeding device includes a supplemental food supply, including a reserve supply of a food product to last substantially a month in situations where the fowl are in a natural habitat. The feeding device design also prevents large animals from consuming large quantities of the food product, as well as insects, typically ants, from removing the stored food product. The feeding device is adjustable to enable recently hatched fowl to access the feeding device. The water supply device ensures that the fowl have adequate water at all times. The water supply must be refilled substantially every six months, when located within a barrier assembly. While this fowl retention system may be utilized with any type of fowl, it has been designed for use with quail and quail populations.

Figure 1:
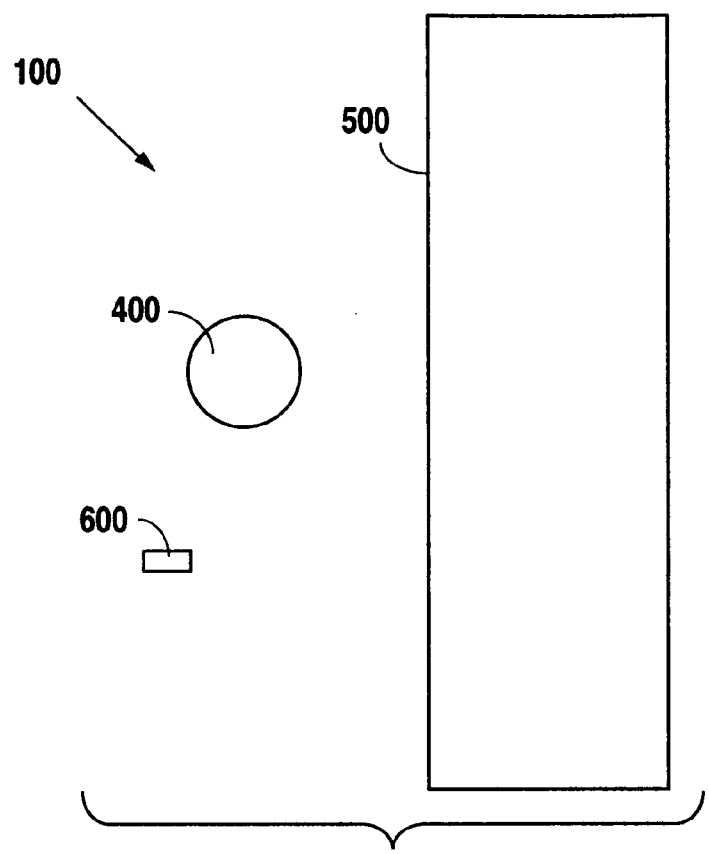
FIG. 1 provides a block diagram representing a fowl retention system according to the preferred embodiment.
Figure 2A:
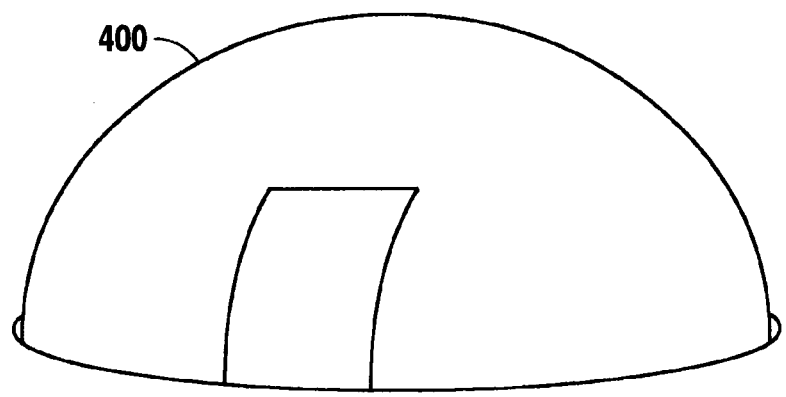
FIG. 2a provides a plan view of a protective structure according to the preferred embodiment.
Figure 2B:
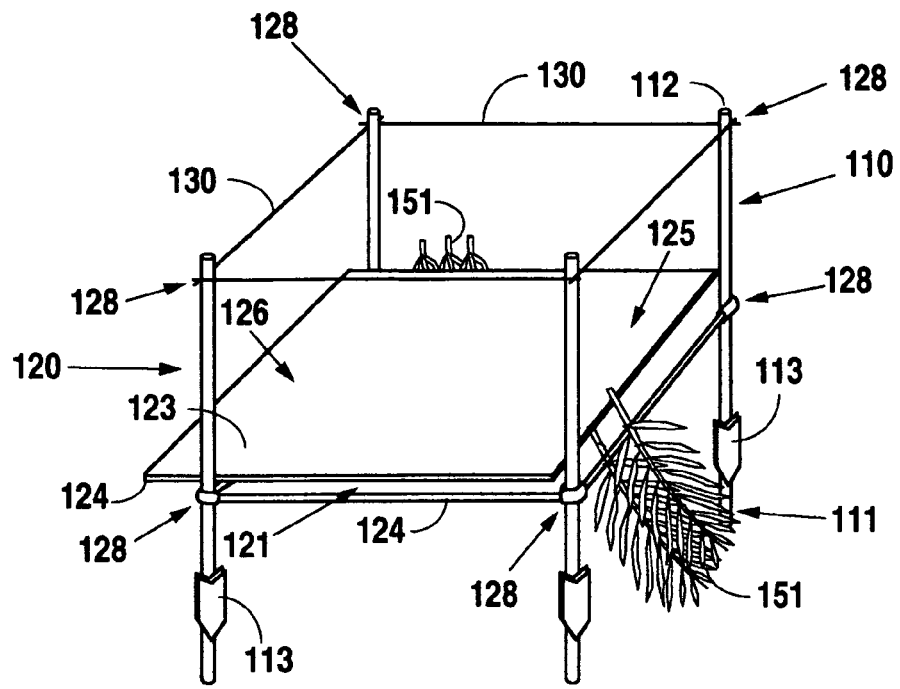
FIG. 2b illustrates a partially assembled protective structure.
Figure 2C:
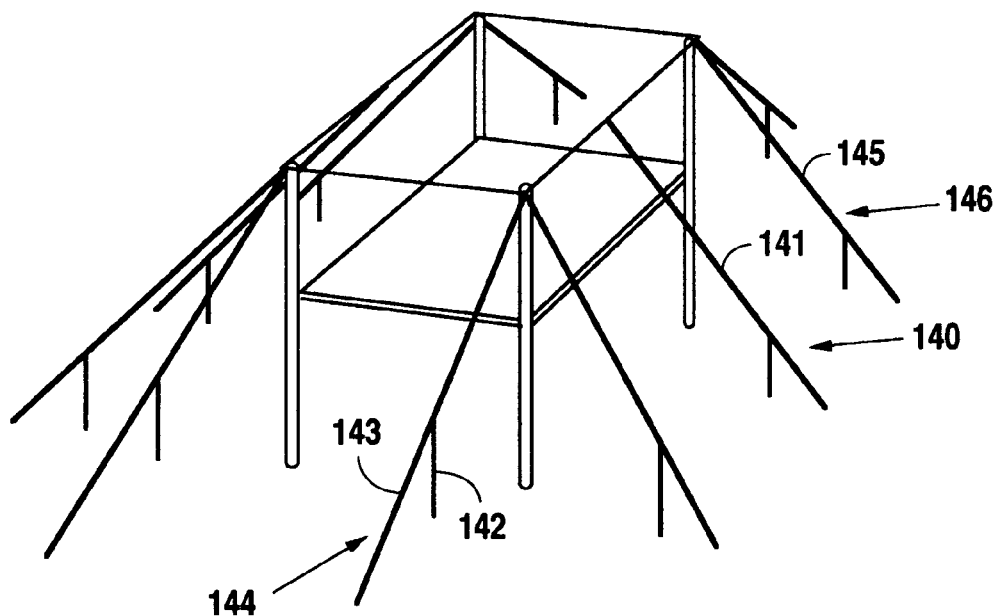
FIG. 2c provides a perspective view of a protective structure including radial supports according to the preferred embodiment.
Figure 2D:
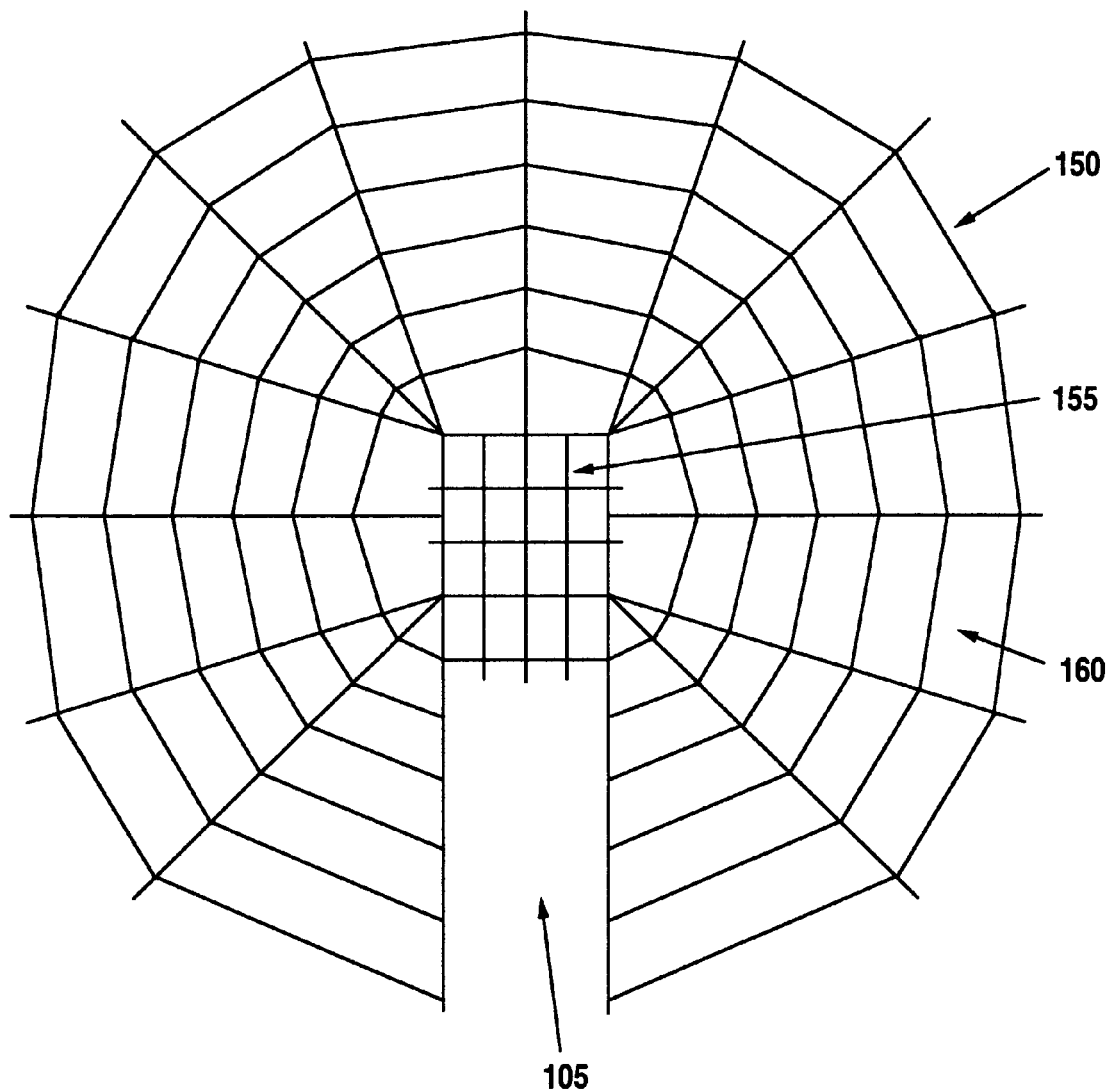
FIG. 2d provides a plan view of an assembled protective structure according to the preferred embodiment.
Figure 3A:
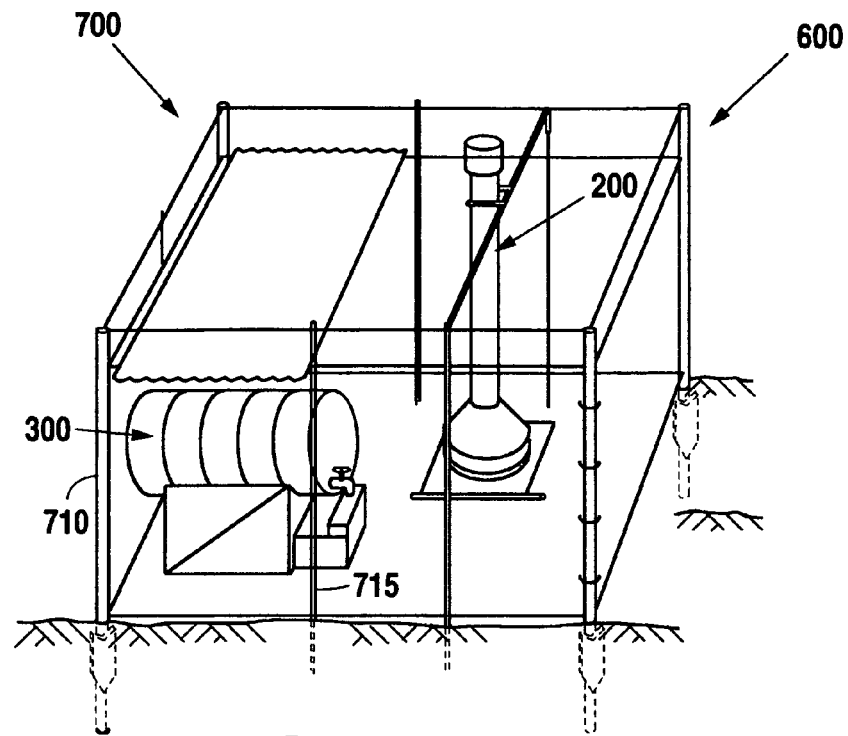
FIG. 3a provides a perspective view of a fully outfitted station according to the preferred embodiment.
Figure 3B:
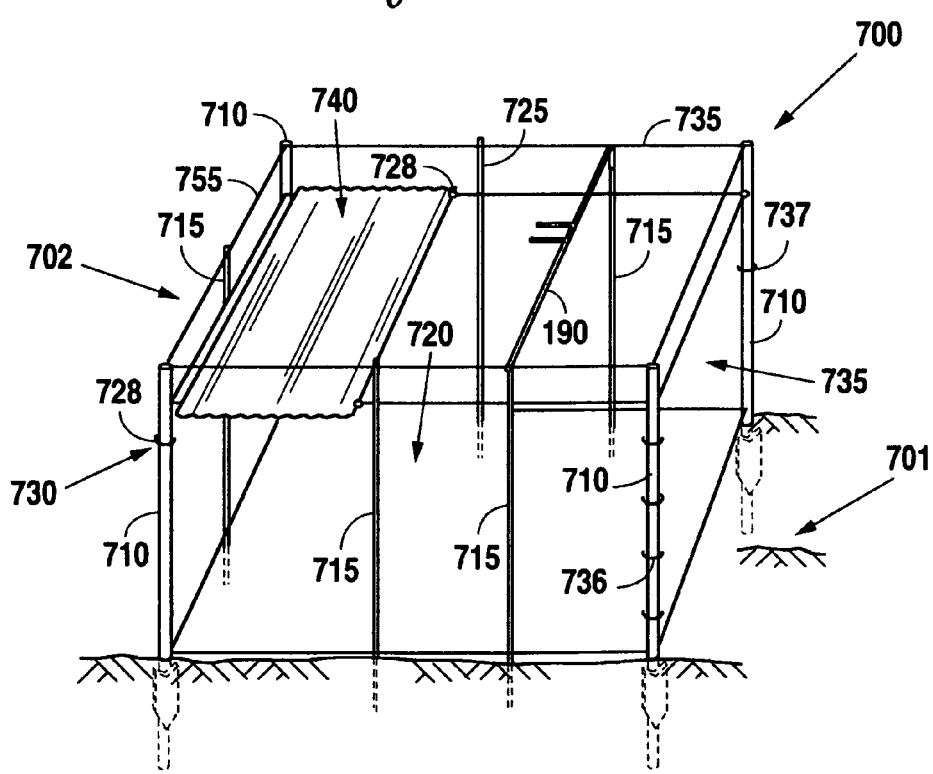
FIG. 3b is a perspective view of a barrier assembly according to the preferred embodiment.
Figure 3C:
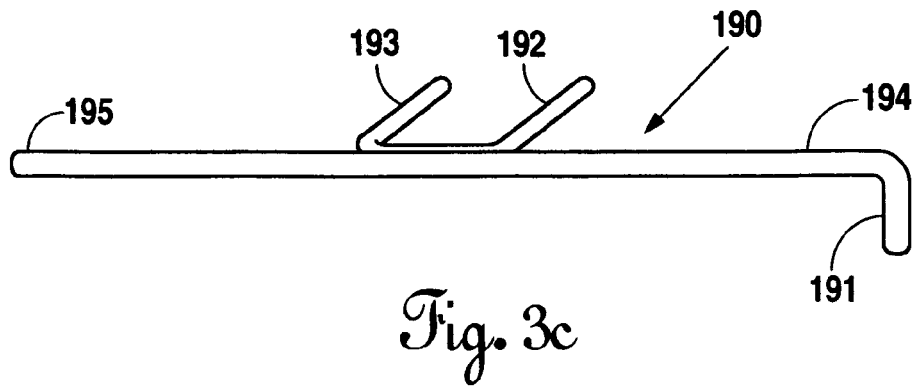
FIG. 3c provides a perspective view of a feeder support according to the preferred embodiment.
Figure 4A:
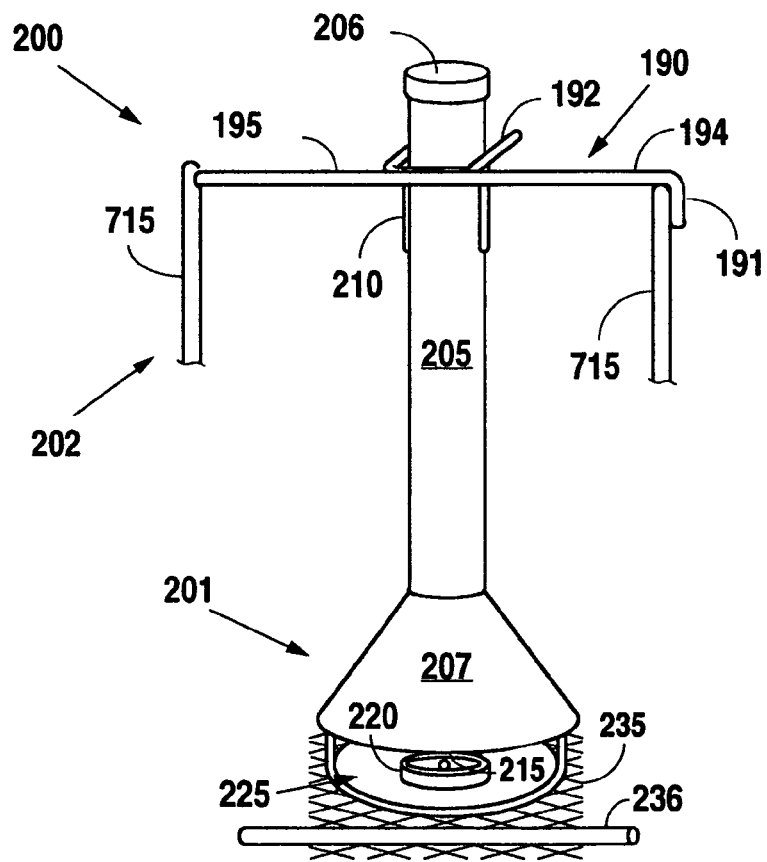
FIG. 4a provides a perspective view of a fowl feeding device according to the preferred embodiment.
Figure 4B:
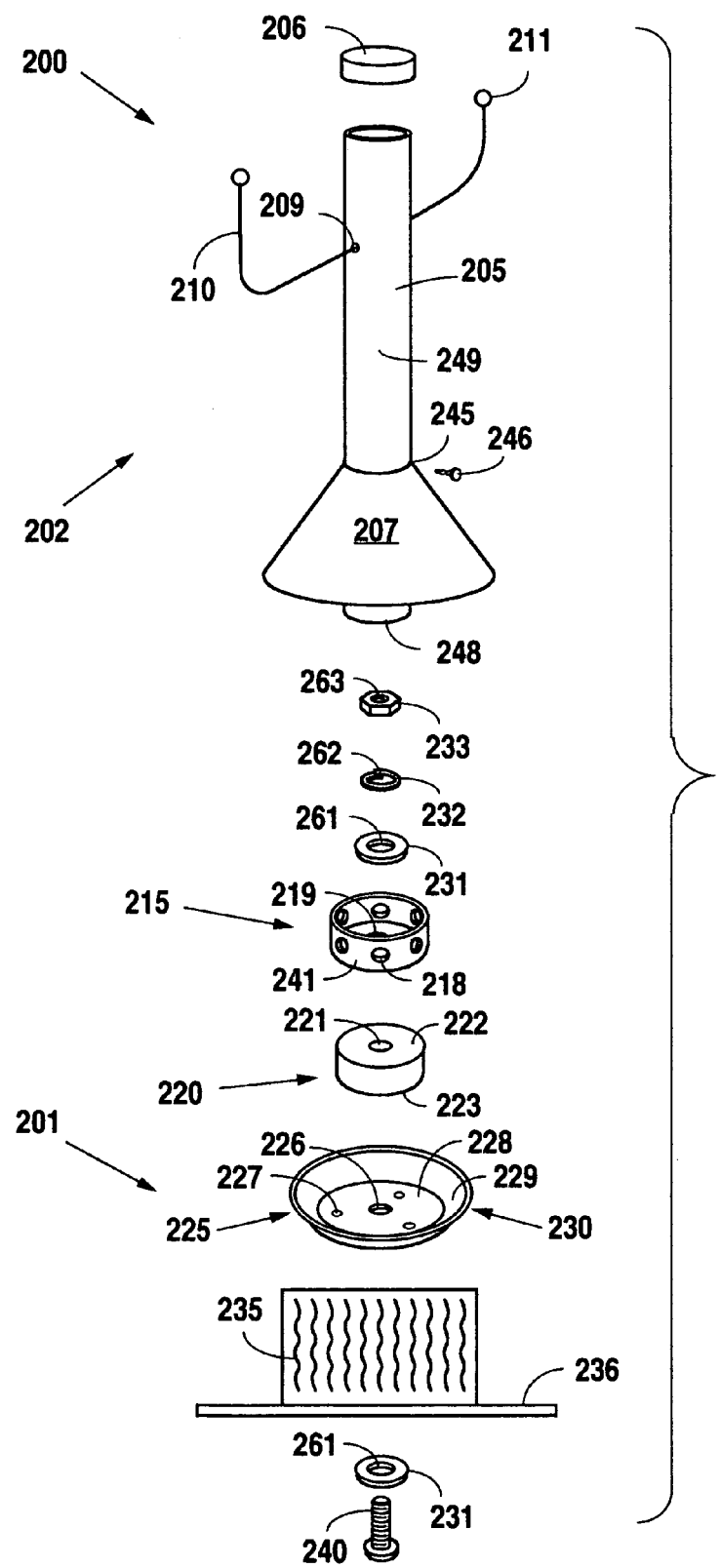
FIG. 4b provides an exploded view of the fowl feeding device according to the preferred embodiment.
Figure 4C:
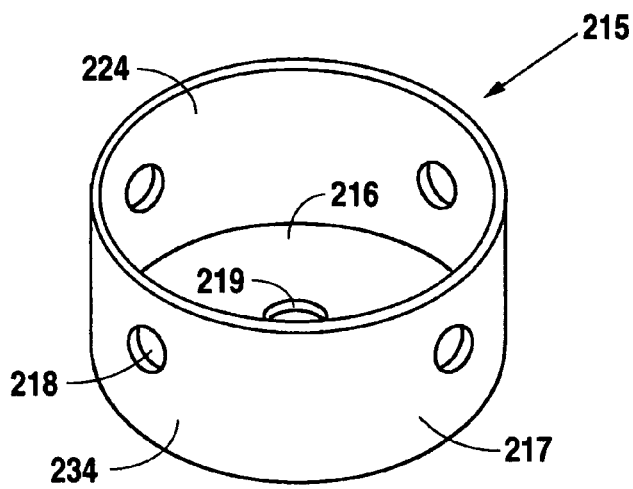
FIG. 4c is a perspective view of a dispense cap according to the preferred embodiment.
Figure 4D:
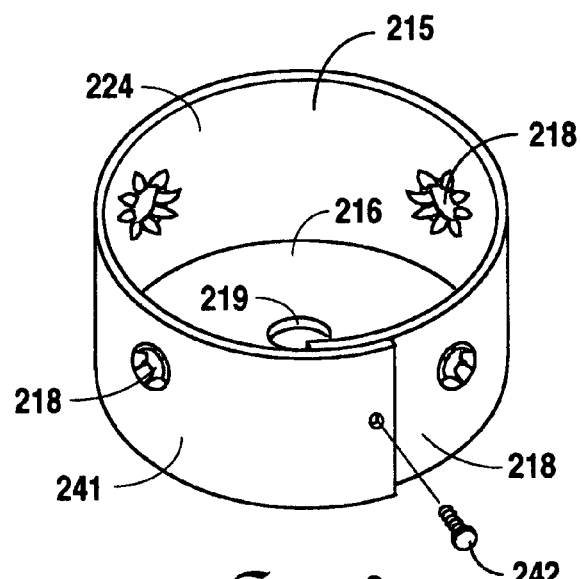
FIG. 4d is a detail view of the dispense cap with an attached shield according to the preferred embodiment.
Figure 4E:
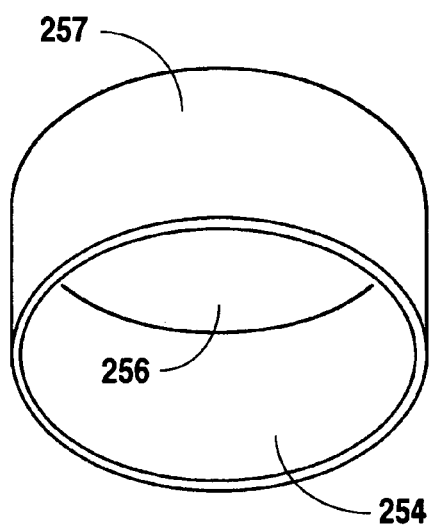
FIG. 4e provides a detail view of the cap according to the preferred embodiment.
Figure 5:
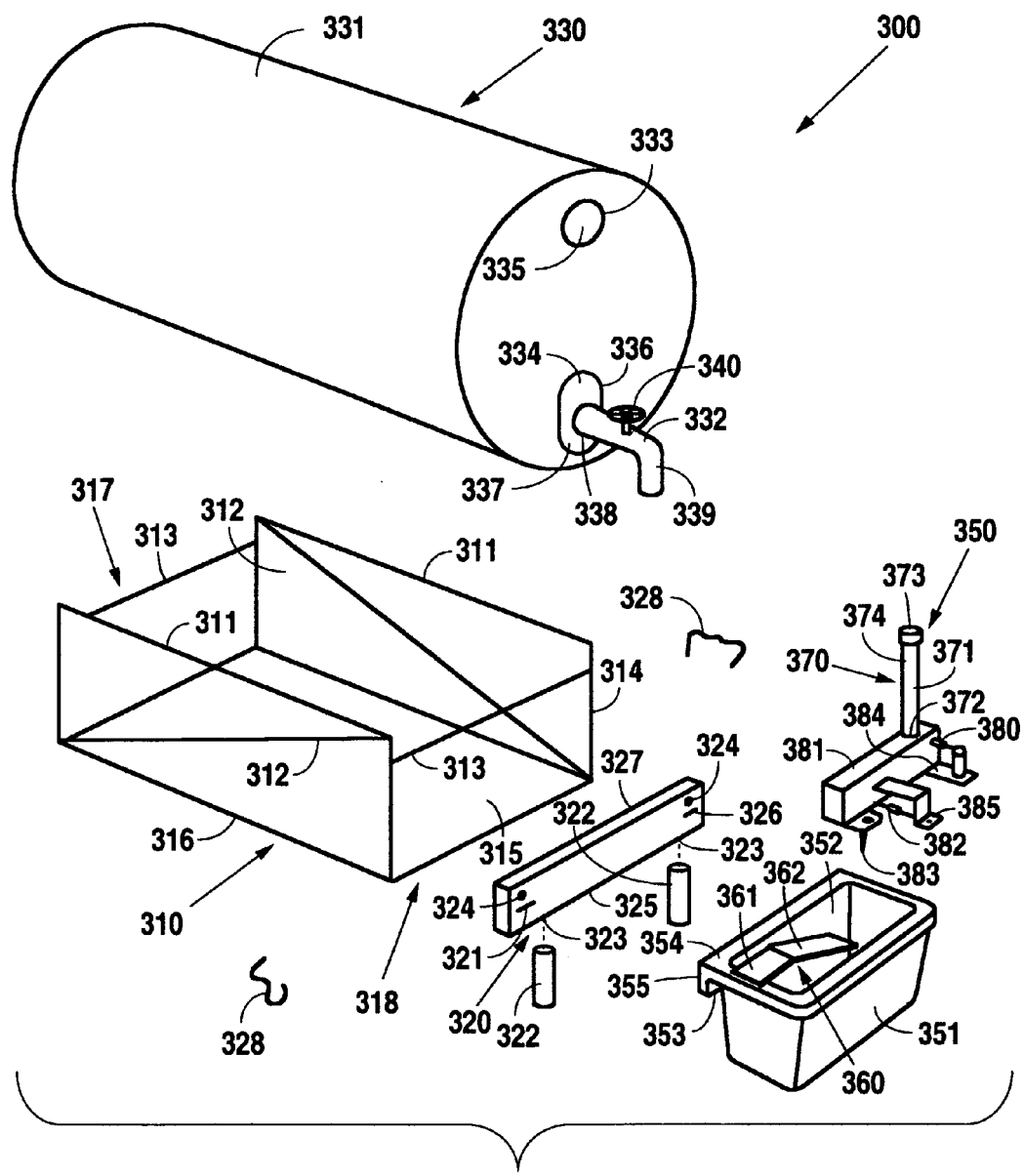
FIG. 5 provides an exploded view of a water supply according to the preferred embodiment.

As shown in FIGS. 1–5, a fowl retention system 100 includes a protective structure 400, a station 600, and a strip 500. The protective structure 400 is a structure used to provide the fowl with shelter from the elements, as well as predators. The protective structure 400 includes uprights 110, a roof assembly 120, horizontal supports 130, radial supports 140, circumferential supports 150, a skirt 151, and at least one cover 160. The protective structure 400 includes four uprights 110. The uprights 110 are metallic extrusions having a first end 111 and a second end 112. The uprights 110 include a lateral support 113 near the first end 111. The lateral support 113 may be permanently attached to the upright 110 through any suitable process, for example welding.

The roof assembly 120 includes a roof structure 121 and a roof 125. The roof structure 121 may be of any suitable material and shape to provide support to the roof 125. In this preferred embodiment, the roof structure 121 is of a wood construction. The roof structure 121 is substantially square with an upper surface 123 and a lower surface 124. The roof structure 121 is substantially rigid, and able to span its length with minimal deflection. The roof 125 is an impervious sheet having a first side 126 and a second side 127. The roof 125 is slightly larger than the roof structure 121 in one dimension. The roof 125, in this preferred embodiment, is of a metallic construction, however, any suitable material may be used, for example sheet metal. One of ordinary skill in the art will recognize that the roof assembly 120 may be constructed as a single unit, thereby eliminating a component.

The horizontal supports 130 are metallic bars having a diameter of five eighths of an inch; however, any suitable material and cross-section having a high stiffness may be used. In this preferred embodiment, the horizontal supports are made of a steel.

The radial supports 140 are metallic bars having a diameter of five eighths of an inch; however, any suitable material and cross-section may be used. The radial supports 140 include a radial leg 141 and a mid-brace support 142. The radial legs 141, in this preferred embodiment, are constructed of steel and are ten feet long. The mid-brace supports 142, having a first end 143 and a second end 144, are constructed of steel reinforcing bar having a diameter of one half of an inch and thirty inches in length. The first end 143 of the mid-brace support 142 is connected to a mid point of the radial leg 141 by any suitable means, for example, welding, or tying with a wire.

The circumferential supports 150 are constructed of metallic bars having a diameter of three eighths of an inch. In this preferred embodiment, the circumferential supports 150 are constructed from a steel reinforcing bar; however, any suitable material and cross-section may be used.

The protective structure 400 further includes cap supports 155 that support an upper portion of the cover 160. In this preferred embodiment, the cap supports 155 are constructed from metallic bars, and are of similar size to the circumferential supports 150; however, the lengths may vary.

The cover 160, in this preferred embodiment, is a natural vegetation covering constructed of dried leaves that do not degrade quickly, for example, palm leaves. However, any suitable material may be used, including man-made materials, to provide at least one layer of covering for the protective structure 400. One of ordinary skill in the art will recognize that various types of natural vegetation may be used as the covering material, as well as combinations of man-made and natural materials.

Upon assembly, the first ends 111 of the four uprights 110 are embedded at a predetermined spacing into the ground to a depth of approximately one foot. The spacing substantially mirrors the width of the roof assembly 120, such that each upright 110 is approximately four feet from the nearest upright. Once embedded, the roof structure 121 is suspended between the uprights 110 such that a lowest point of the roof assembly 120 is approximately fourteen inches from the ground. The roof structure 121 may be secured to the uprights 110 using any suitable means, for example, tying with a wire 128. After securing the roof structure 121, the roof 125 may be placed on top of the roof structure 121 such that the roof 125 completely covers the roof structure 121. The roof 125 may be secured using any suitable means, for example, fastening with screws (not shown).

After installing the roof assembly 120, the horizontal supports 130 may be attached to each pair of the uprights 110 surrounding the roof assembly 120. The horizontal supports 130 in this preferred embodiment are secured to the second ends 112 of the uprights 110 at a distance of approximately forty-one inches from a ground level. The horizontal supports 130 may also be secured to the uprights 110 using any suitable means, such as tying with the wire 128.

The skirt 151 is a natural vegetative barrier located between the roof structure 121 and the ground. The skirt 151 is placed on three sides of the roof structure 121 to partially enclose the area located beneath the roof structure 121. The skirt 151 is typically constructed of palm leaves or other plant having thorns.

Next, a first end 145 of the radial support leg 141 is secured to the horizontal supports 130 using any suitable means, for example, tying with the wire 128. The second end 146 of the radial support leg 141 rests on the ground. In this preferred embodiment, fifteen radial support legs 141 are utilized, three connected at each upright 110, and one along a midpoint of three of the horizontal supports 130. The fourth horizontal support 130 does not receive a radial support leg 141, thereby creating an access location or door 105. The radial support legs 141 extend from the horizontal supports 130 to the ground in a substantially evenly divided arrangement. The second end 144 of the mid-brace supports 142 is embedded into the ground at approximately a midpoint of each radial support leg 141 to a depth suitable for providing support. The first end 143 of the mid-brace supports 142 is then secured to the radial support leg 141 using any suitable means, for example, tying with the wire 128. Accordingly, the radial support legs 141 are supported at three points.

The circumferential supports 150 are now placed upon the radial support legs 141 at a spacing of approximately seventeen inches. The circumferential supports 150 are secured to the radial support legs 141 using any suitable means, for example tying with the wire 128. Circumferential supports 150 are not placed over the door 105. Next, the cap supports 155 are placed over the area directly above the floor 125. The cap supports 155 are also secured to the horizontal supports 130 with the wire 128. In this fashion, the protective structure 400 is completely covered, except for the door 105.

The cover 160 may now be applied to the structure. In this preferred embodiment, the cover 160 is constructed of palm leaves. The cover 160 may be applied in whole or in part to the structure to provide a semi-secure sanctuary for the fowl. The cover 160 is not applied to the door 105 of the protective structure 400.

Other embodiments may include a living canopy planted to grow over the cover 160, thereby providing additional shading and security. The living canopy may be constructed from any type plant that grows in a vine, for example, Virginia creeper or morning glory.

In use, the fowl are able to enter and exit the protective structure 400 as desired. The fowl utilize the area below the roof structure 121 for protection from the elements, predators and extreme weather conditions, Large predators may not disturb the structure to a great degree due to the steel framing. Smaller animals may take up residence in the protective structure 400. The use of the protective structure substantially decreases the number of fowl that are lost to predator, namely birds of prey. Operators may clean the protective structure 400 from the door 105.

The fowl station 600 includes a fowl feeding device 200, a water supply 300, and a barrier assembly 700. The barrier assembly 700 includes primary stakes 710, secondary stakes 715, a front panel 720, a rear panel 725, a side panel 730, and a door panel 735. The barrier assembly 700 further includes a roof panel 740, a feeder support 190, and a stabilizing cable 755. The primary stakes 710 are constructed of metallic extrusions with an attached lateral support 711. The primary stakes 710 are available on the commercial market and are commonly referred to as T-posts. The primary stakes 710 may be constructed of other materials having a suitable stiffness and bearing capacity.

The secondary stakes 715 are constructed of metallic rods having a diameter of five eighths of an inch. The secondary stakes 715, in this preferred embodiment, are made of a steel, however, one of ordinary skill in the art will recognize that the construction of the secondary stakes 715 may be of any suitable material having suitable stiffness and bearing capacity.

The front panel 720 is constructed from a six-gage wire mesh material with a four inch by four inch grid. The wire mesh material is available in lengths of ten feet and a width of substantially four feet. The front panel 720 is approximately ten feet long and four feet wide. The rear panel 725 is substantially identical to the front panel 720 in construction and dimension. The side panel 730 is of the same construction as the front and rear panels 720 and 725, however, the side panel 730 is only fifty-two inches long. The door panel 735 is also of the same construction as the other panels. The door panel 735 is approximately sixty inches long. One of ordinary skill in the art will recognize that the lengths of the front, rear, and side panels 720, 725, and 730 may be adjusted without altering the intent of the barrier assembly 700.

The roof 740 is of a sheet-metal construction. The roof 740 is substantially sixty inches long and fifty-two inches wide. In this preferred embodiment, the roof 740 is corrugated iron, however, one of ordinary skill in the art will recognize that any suitable material may be used for coverage.

The feeder support 190 includes a first end 194 and a second end 195. The first end 194 includes a downturn segment 191 that is oriented substantially ninety degrees from the feeder support 190. The feeder support 190 further includes a first tube stabilizer 192 and a second tube stabilizer 193 attached substantially in the center of the feeder support 190 in a plane essentially perpendicular to the plane of the downturn segment 191 and the feeder support 190. The first tube stabilizer 192 and the second tube stabilizer 193 are spaced apart by a distance dictated by a product tube of the fowl feeding device 200, such that the product tube may be placed between the tube stabilizers 192 and 193 for stability along the feeder support 190.

Upon construction of the barrier assembly 700, four primary stakes 710 are forced into the ground at a predetermined spacing. In this preferred embodiment, the spacing is of a trapezoid shape having a base length of five feet, a top length of four feet and four inches, and side length of ten feet each. The base of the trapezoid may be referred to as a first end 701, and the top of the trapezoid may be referred to as a second end 702. This spacing mirrors the lengths of the panels 720, 725, 730, and 735 of the barrier assembly. Each of the primary stakes 710 is embedded into the ground at each corner to a suitable depth, wherein an exposed end of the primary stake 710 protrudes beyond the panels by approximately one foot when the panels are installed.

After placing the primary stakes 710 into the ground, the secondary stakes 715 may be embedded into the ground at a predetermined spacing between the primary stakes 710. A secondary stake 715 is embedded on each side of the trapezoid at a distance of approximately thirty-two inches from the first end 701 along the lines lying between the primary stakes 710. A second set of secondary stakes 715 is embedded into the ground at a distance of approximately fifty-two inches from the second end 702 of the barrier assembly 700. A fifth secondary stake 715 is embedded at a midpoint between the primary stakes 710 of the second end 702. While the secondary stakes 715 have been shown to reside at specific locations, it should be clear to one of ordinary skill in the art that the spacing requirements may vary due to variations in hardware, limited sizes of available material, or new developments.

Once the primary stakes 710 and the secondary stakes 715 have been installed, the panels 720, 725, and 730 may be installed. The panels may be attached at their respective locations using any suitable means, such as wire restraints or tying with a wire 728. The stationary panels are permanently secured at ground level to the primary stakes 710 and the secondary stakes 715, therein forming a partial enclosure.

The door panel 735 may be installed at the first end 701 of the enclosure. The door panel 735 is connected with a wire hinge 736 to one of the primary stakes 710 at the first end 701 of the barrier assembly 700. Multiple wire hinges 736 may be used; one of ordinary skill in the art will recognize that the wire hinge is a cost-effective means to provide the door panel 735 with a rotating capability. Once the wire hinge 736 is installed, the door panel 735 may rotate about the attached primary stake 710. The door panel 735 will rotate until it hits the second primary stake 710 located at the first end 701 of the barrier assembly 700. The door panel 735 further includes a wire latch 737 used to lock the door panel 735 in a closed position.

The roof 740 may be installed on top of the front panel 720 and the rear panel 725, substantially centered such that the ends of the roof 740 extend beyond a perimeter of the barrier assembly 700. The roof 740 provides cover to components of the station 600, as well as the fowl when they are within the confines of the station 600. The roof 740 may be secured using any suitable means, such as tying with the wire 728.

The stabilizing cable 755 is tied around the exposed ends of the primary stakes 710 to provide additional support and further unitize the barrier assembly 700.

In use, operators locate the fowl feeding device 200 and the water supply 300 within the perimeter of the barrier assembly 700. The operator may open the door panel 735 to gain access to the interior of the barrier assembly 700. The water supply 300 is placed beneath the roof 740, thereby protecting the tank from the elements, particularly the ultra violet rays of the sun. The operator hangs the feeding device 200 from the feeder support 190. The feeding device 200 includes a reserve supply of food product to last substantially a month in situations where the fowl are in a natural habitat. The operator fills the water supply tank 331 and the feeding device 200. The barrier assembly 700 prevents large animals from accessing the water supply 300 and the feeding device 200. Smaller animals may gain access to the interior of the barrier assembly 700; however, the design of the feeding device 200 prevents large quantities of food product from being consumed by the smaller animals. In use, the fowl are able to access the interior portion of the barrier assembly 700 to obtain food product from the fowl feeding device 200, and to drink water from the water supply 300. While the barrier assembly 700 may be suitable for use by different types of fowl, it has been designed primarily for use with quail and quail populations.

As shown in FIGS. 4*a*–4*e*, the fowl feeding device 200 includes a lower assembly 201, and an upper assembly 202. The lower assembly 201 includes a landing 235, a perch 236, a dish 225, a riser block 220, and a dispense cap 215. The landing 235 is an essentially square piece of mesh type material, expanded metal in this preferred embodiment. The landing 235 is approximately one foot by one foot in this device, however, one of ordinary skill in the art will recognize that the size and shape of the landing 235 may vary dependent upon the size and quantity of the fowl. The landing 235 is used to provide a resting point for multiple fowl at the feeding device 200, as well as a landing point from flight. The perch 236 is a cylindrical rod used as a resting point for the fowl. In this preferred embodiment, the perch 236 is a wooden dowel, approximately five eighths of an inch in diameter and eighteen inches long. The perch 236 is coupled to an edge of the landing 235, substantially centered on that edge, such that two resting points are provided. The perch 236 may be coupled to the landing 235 using any suitable means, including screws or wire ties.

The dish 225 includes an inner cavity defined by a floor 228, a wall 229, and a lip 230. The lip 230 is raised above the floor 228 to create the inner cavity. The dish 225 is used to retain food product, however, the floor 228 does include drain apertures 227 to allow fluids to exit the inner cavity of the dish 225. The floor 228 further includes a mounting aperture 226 centered in the dish 225. The dish 225 is approximately nine inches in diameter; however, one skilled in the art will recognize that any size dish 225 may be used. The dish 225, in this preferred embodiment, is of sheet metal construction, however, any suitable material may be used, such as plastic.

The riser block 220 includes a first face 222 and a second face 223. The riser block 220 is used to raise the dispense cap 215 above the floor 228 of the dish 225 to a suitable pecking height for the fowl. In this preferred embodiment, the suitable pecking height is in the range of one and a half to two inches. The riser block 220 further includes a mounting aperture 221 centered on the first face 222, and passing through the riser block 220 to the second face 223.

The dispense cap 215 includes a floor 216 coupled to a wall 217, thereby creating an inner cavity. The dispense cap 215 further includes an inner periphery 224, an outer periphery 234, and dispense apertures 218 passing from the inner periphery 224 to the outer periphery 234. The floor 216 includes a mounting aperture 219 located substantially centered in the floor 216. The dispense cap 215, in this preferred embodiment, is constructed of polyvinyl chloride for strength and ease of use. The dispense cap 215 still further includes a shield 241 wrapped around the outer periphery 234 of the dispense cap 215, and secured thereto. The shield 241 may be secured to the dispense cap 215 using any suitable means including sheet metal screws 242. In this preferred embodiment, the shield 241 is constructed from sheet metal, such as galvanized steel. The shield 241 covers the dispense apertures 218, however, the sheet metal covering the dispense apertures 218 is punched with a suitable tool to pierce and splay the sheet metal through the dispense apertures 218, thereby partially lining the edges of the dispense apertures 218. This process provides protection from the enlarging of the dispense apertures 218 by animals seeking food.

The lower assembly 201 further includes a bolt 240, washers 231, a lock washer 232, and a nut 233. The bolt 240 is inserted through an aperture 261 in the washer 231. The bolt 240 is then inserted through approximately the center of the landing 235, through the mounting aperture 226 of the dish 225, through the mounting aperture 221 of the riser block 220, and through the mounting aperture 219 of the floor 216 of the dispense cap 215. Once all the components are aligned properly, an aperture 261 of a second washer 231 is placed over the bolt 240, an aperture 262 of the lock washer 232 is placed over the bolt 240, and a threaded aperture 263 of the nut 233 is threaded onto the bolt 240. The bolt 240 and nut 233 are tightened to secure the components.

The upper assembly 202 includes a product tube 205, a shroud 207, a hanger 210 and a cap 206. The product tube 205 is of a thin wall hollow construction, and includes an outer periphery 249, a first end 247 and a second end 248. In this preferred embodiment, the product tube 205 is constructed from polyvinyl chloride; however, any suitable material may be utilized. The product tube 205 is approximately fifty-seven and one fourth inches long. It should be noted that additional length of the product tube 205 increases the quantity of reserve food product in the feeding device 200. The product tube 205 further includes a hanger aperture 209 on opposite sides of the product tube 205. The hanger apertures 209 are located approximately forty-six inches from the second end of the product tube 205.

The shroud 207 includes a flange 245 used to attach the shroud 207 to the product tube 205. The flange 245 of the shroud 207 is attached to the product tube 205 at approximately ten and one half inches from the second end 248 of the product tube 205 using sheet metal screws 246. The ends of the shroud 207 are connected together to form a continuous shape around the product tube 205. All joints between the shroud 207 and the product tube 205 and the shroud 207 ends are sealed with a sealer, illustratively, RTV, to prevent the seepage of rain down the product tube 205 and into the dish 225. While the shroud 207 may be virtually any size, it should be clear to one skilled in the art that the shroud 207 should be larger than the dish 225, to ensure that water draining off of the shroud 207 does not land in the dish 225.

The cap 206 includes a floor 256, and a wall 257 having an inner periphery 254. The floor 256 is coupled to the wall 257, thereby creating an inner chamber. The inner periphery 254 of the cap 206 is complementary in dimension to the outer periphery 249 of the product tube 205. The cap 206 is constructed of material similar to the material of the product tube 205, illustratively, polyvinyl chloride in this preferred embodiment. The cap 206 resides on the first end 247 of the product tube 205 to protect an inner compartment of the product tube 205. As the cap 206 is removable, no fastening or bonding agent is employed.

Upon further assembly, the second end 248 of the product tube 205 is fit into the inner cavity of the dispense cap 215. The inner periphery 224 of the dispense cap 215 is complementary to the outer periphery 249 of product tube 205. In this preferred embodiment, the product tube 205 and the dispense cap 215 are constructed of a solvent bondable plastic, and are solvent welded together. The assembly is now a single unit with a removable cap 206 and a hanger 210.

The feeding device 200 may be painted for protection from the environment, and blending into the surroundings. Further, a camouflage pattern may be utilized to minimize the impact on the natural setting. In this preferred embodiment, only the upper assembly 201 is camouflaged, however, one skilled in the art will recognize that painting and material color selection may be driven by location specific issues.

The first end 194 of the feeder support 190 may be connected to the secondary stakes 715 nearest the first end 701 of the barrier assembly 700 using any suitable means, such as a wire, to secure the downturn segment 191 to the secondary stake 715. Once the downturn segment 191 is secured to the secondary stake 715, the feeder support 190 is prohibited from rotating. The second end 195 of the feeder support 190 may also be secured to the remaining secondary stake 715 nearest the first end 701 of the barrier assembly 700. The feeder support 190 should be secured in a horizontal position to ensure that the feeding device 200 rests in a vertical position.

The hanger 210 is inserted into a first hanger aperture 209 and out through a second hanger aperture 209. The hanger 210 is used to suspend the feeding device 200. A ring 211 may be constructed out of the hanger 210 to fit around one of the tube stabilizers 192 or 193. With a ring 211, an operator is able to secure one end of the hanger 210 around one of the stabilizers 192 or 193, thereby allowing the operator to adjust the height of the feeding device 200, by pulling the free end of the hanger 210. Once adjusted to the proper height, the free end may be secured to the unused tube stabilizer 192 or 193. The feeding device 200 may be suspended from the feeder support 190 or any suitable object. The hanger 210 is adjustable to allow for raising of the feeding device 200 from a near ground level to approximately one foot above the ground level. Suspending the feeding device 200 minimizes the possibility of ants consuming all the food product in the feeding device 200.

In use, an operator must remove the cap 206 from the first end 247 of the product tube 205, and add a preferred seed or seed blend. Typical seeds used in this preferred embodiment include sorghum grain, corn, premixed blends, and various blends thereof.

The feeding device 200 may then be installed in a preselected area. The operator suspends the feeding device 200 from the feeder support 190, such that the landing 235 is approximately four to six inches above the ground level for young fowl. As the fowl increase in size, the feeding device 200 may be raised to a nominal height of twelve inches from the ground level. The suspension of the feeding device 200 prevents pests, namely ants, from exhausting the food product supply. Small animals can easily gain access to the feeding device 200, however, the dispense apertures 218 are sized such that minimal food product can be accessed by the small animals. Further, the shield 241 protects the dispense apertures 218 from being enlarged by the small gnawing animals.

Once installed, the fowl are able to peck at the food product exposed through the dispense apertures 218. The dispense apertures 218, in this preferred embodiment are approximately one-half of an inch in diameter. The fowl consume the food product that is successfully pecked out of the feeding device 200. The food product that ends up falling due to the pecking lands in the dish 225, and can also be consumed by the fowl.

The feeding device 200 ensures that food product is available to fowl for extended periods, approximately one month in this preferred embodiment. The placing of the fowl feeding device 200 into the barrier assembly 700 prevents large animals from approaching the fowl feeding device 200. While this embodiment has been constructed for use in a natural environment, it should be clear to one skilled in the art that the feeding device 200 may also be used in an enclosed environment, such as a large pen or cage.

The water supply 300 is a long-term solution to the problem of continuously providing water to fowl in a natural setting. The water supply 300 when located within the barrier assembly 700 provides water for substantially six months between refills. The water supply 300 includes a stand assembly 310, a storage assembly 330, and a trough assembly 350. The stand assembly 310 includes lateral supports 311, diagonal supports 312, and cross supports 313. The lateral supports 311 are constructed of metallic bars and include a first end 314 and a second end 315. The lateral supports 311 are bent into a rectangular shape, in a pattern substantially twenty-four inches by twenty inches. Once bent into the rectangular shape, the first end 314 is permanently secured to the second end 315 through any suitable means, for example, welding.

The diagonal supports 312 are constructed of metallic bars and are of a length suitable for being permanently attached to the interiors of two corners of the assembled lateral supports 311. The diagonal supports 312 may be permanently secured to the lateral supports 311 using any suitable attachment means, for example, welding.

The cross-supports 313 are constructed of metallic bars having a diameter of approximately five eights of an inch and a length of approximately twenty inches. The cross-supports 313 are permanently secured between the lateral supports 311 at the corners of a lower end 316 and approximately five and a half inches from an upper end 317 using any suitable means, such as welding.

Once assembled, the stand assembly 310 may be painted for corrosion protection and to blend into the surroundings.

The stand assembly 310 further includes a trough support assembly 320. The trough support assembly 320 includes a support beam 321 and a plurality of standoffs 322. The beam 321 in this preferred embodiment is constructed of a wood section approximately two inches by four inches with a length approximately twenty-one and five eighths inches. The beam 321 includes a front face 326, a rear face 327, and a bottom face 325. The beam 321 includes two blind apertures 323 on the bottom face 325 sized to accept the standoffs 322 and two restraint apertures 324 passing through the beam 321 from the front face 326 to the rear face 327. The blind apertures 323 are substantially centered on the bottom face 325 approximately four inches from each end. The standoffs 322 are constructed of a polyvinyl chloride pipe section having an interior diameter of approximately one half of an inch. The standoffs 322 are of a length such that approximately one and three eighths of an inch of the standoffs 322 protrude from the beam 321 when the standoffs 322 are fully engaged into the blind apertures 323.

The restraint apertures 324 are approximately one eighth of an inch in diameter and are located in the general area of each end of the beam 321 such that there is adequate edge distance to the ends of the beam 321. On assembly, the trough support assembly 320 is secured to a front end 318 of the stand assembly 310 using any suitable means, for example, tying with a wire 328. The trough support assembly 320 is secured to the stand assembly 310 such that the standoffs 322 point downward. When installed, the standoffs 322 elevate the front end 318 of the stand assembly 310 above the ground, thereby protecting the beam 321 from termites.

The trough assembly 350 includes a trough 351, a ramp 360, a supply hose assembly 370, and a float valve 380. The trough 351 is a readily available container designed to contain liquids for livestock. In this preferred embodiment, the trough 351 is constructed out of a resin; however, any suitable material may be used. The trough 351 includes a bin 352 for holding a liquid and an overhang 353. The bin 352 is of a size suitable to hold approximately two gallons of liquid, however, one of ordinary skill in the art will recognize that the size of the bin 352 may vary. The overhang 353 in this preferred embodiment is integral to the bin 352. The overhang 353 includes a topside 354 and a lip 355. In use, the overhang 353 and the lip 355 wrap around the support beam 321 to cantilever the trough assembly 350 off the front end 318 of the stand assembly 310.

The float valve 380 is readily available and is used to maintain a prescribed water level in a container. In this preferred embodiment, the water level is maintained in the trough 351 such that the fowl have a readily available water supply. The float valve 380 includes an inlet 381, an outlet 382, and a float 383. The float valve 380 further includes support brackets 384 and fasteners 385 to secure the float valve 380 in place. In this preferred embodiment, the inlet 381 is a female hose connection. The float valve 380 includes a "flow" and a "no flow" position.

The supply hose assembly 370 includes a hose 371, a male hose connector 372, a female hose connector 373, and a hose covering 374. The hose 371 is common plastic tubing, preferably with an inner diameter of one half of an inch. The hose 371 is approximately ten and a half inches long; however, one of ordinary skill in the art will recognize that the length of the hose 371 may be dictated by location specific variables as well as the location of the storage assembly 330. One of ordinary skill in the art will further recognize that the hose connections may include any suitable types of connection, including barb, quick disconnect, and the like. In this preferred embodiment, the hose covering 374 is placed around the hose 371 to provide protection from chewing by animals. The hose covering 374 in this preferred embodiment is constructed from a metal flex covering.

The ramp 360 resides in the trough 351 and is designed to provide the young fowl with a means to walk out of the water should any accidentally fall into the water supply. The ramp 360 is constructed from expanded metal and is of a size complementary to the space remaining in the trough 351. The ramp 360 is bent to include a deck 361 and an incline 362. The deck 361 rests on the topside 354 of the trough assembly 350, and the incline 362 extends into the water to rest on a bottom surface in an opposite end of the trough 351. In this position, the ramp 360 cannot completely fall into the water. As such, fowl that accidentally end up in the water may make their way up the incline 362 to the deck 361 and out of the water.

The storage assembly 330 includes a tank 331 having a first port 333 and a second port 334. In this preferred embodiment, the tank 331 is constructed of a plastic; however, any material suitable for containing potable water in large quantities could be utilized. The tank 331 holds substantially fifty-five gallons of a liquid. However, one of ordinary skill in the art will recognize that the capacity of the tank 331 may be scaled up or down depending upon the refill frequency. The first port 333 includes a first bung 335 that can be removed for filling. The second port 334 includes a second bung 336 having an aperture 337. An inlet port 338 of a spigot 332 is inserted into the aperture 337 of the second bung 336. The spigot 332 is a conventional piece of equipment having the inlet port 338, an outlet port 339, and a valve 340 that when open allows fluid to flow from the inlet port 338 to the outlet port 339.

On assembly, the storage assembly 330 is placed on top of the stand assembly 310, and the female hose end 373 of the hose assembly 353 is connected to the outlet port 339 of the spigot 332. As the tank 331 resides above the elevation of the trough assembly 350, the water in the tank 331 will flow due to gravitational forces from the tank 331 to the trough 351 when the spigot 332 is opened.

In use, an operator fills the tank 331 with water approximately every four to six months. The tank 331 is filled by removing the first bung 335 from the first port 333 of the tank 331. After filling, the operator replaces the first bung 335 into the first port 333. The spigot 332 is now opened to allow water to move toward the float valve 380. If the trough 351 is in a low level condition, the float valve 380 allows water to flow into the trough 351. As the fluid level in the trough 351 rises, the float 383 moves with the water level. Once the float 383 reaches the prescribed level, the float valve 380 will shut off the supply of water to the trough 351. As water is consumed or evaporates, the water level drops, and the float valve 380 moves into a flow position to replenish the used portion of the water in the trough 351. The process repeats as necessary, thereby ensuring adequate water is available. Should the trough 351 run out of water, the fowl will be forced to seek another nearby water source.

The habitat strip 500 is a plowed and planted section of land. In this preferred embodiment, the habitat strip 500 is approximately thirty to forty feet wide. The length and shape of the habitat strip 500 may vary dependent upon terrain, adjacent territories, and the number of fowl that will be utilizing the habitat strip 500. The habitat strip 500 is plowed and sown with a variety of native plants that produce seeds at different times of the year, including sorgum allum, brown top millet, brown top panic, bristle grass, sesame, and the like. Seeds from native vegetation last longer in exposed environments without rotting. This type of durability ensures that the fowl have an adequate food supply over the course of the year. The habitat strip 500 may be replowed occasionally to stir the dirt and redistribute the vegetation and seeds present in the ground, preferably every four to five years. The habitat strip 500 further functions to attract insects into the fowl territory.

In use, the fowl may use the habitat strip 500 for cover, nesting, and to further their search for food items, including seeds and insects. The fowl typically spend the early mornings in the habitat strip 500 as it is the primary source of food items, including seeds and insects. The selection of native vegetation that produces at varying times of the year ensures that the fowl have adequate natural food supply at substantially all time of the year. During the nesting season, the fowl may take up residence in the habitat strip 500, to blend into the surroundings and further increase their chances of survival. The habitat strip 500 is important during nesting season, as fowl typically feed insects to their hatchlings. While this habitat strip 500 has been shown to be a strip, it should be clear to one of ordinary skill in the art that the habitat strip 500 may be virtually any shape, yet provide the same features disclosed herewith.

The protective structure 400, the fowl station 600, and the habitat strip 500, working in conjunction with each other, create a fowl retention system 100. The fowl retention system 100 supplies the needs of a fowl flock, thereby enabling the fowl flock to establish a territory. The protective structure 400 provides a shelter from the elements and a sanctuary from predators. The station 600 is placed in the general area of the protective structure 400 to provide a supplemental source of food product and a substantially continuous water supply. In this preferred embodiment, the distance from the protective structure 400 to the station 600 is approximately one hundred to one hundred and fifty feet. The habitat strip 500 is also placed in the general area of the protective structure 400 and the fowl station 600. The habitat strip 500 provides the primary food sources, as well as a nesting area for the fowl. The close proximity of the components with respect to each other minimizes the exposure associated with moving from one of the elements to another; particularly, the chances of the fowl being attacked by other animals such as birds of prey.

In use, a fowl flock takes up residence around the water supply 300, thereby utilizing the feeding device 200, the habitat strip 500, and the protective structure 400. As the fowl become comfortable in the surroundings, and have plenty of nourishment, they have no desire to move elsewhere. They may reproduce, thereby providing a continuing source of fowl. As the fowl are in a natural habitat and have a constant supply of food, they are stronger than captive birds, and tend to grow larger than the average wild fowl.

In the wild, fowl territories may cover up to two hundred acres. Use of the fowl retention system 100 reduces the required territorial range down to approximately ten acres. With the fowl retention system 100, the fowl territories may be established in virtually any location. As such, the fowl territories may be located based upon plat lines, terrain limitations, or just created in a designated area. The fowl flock may already be present, may be split from an existing flock or may be newly transplanted to the fowl retention system 100.

With now substantially reduced acreage requirements for the fowl territories, operators may compress the locations of the fowl territories to increase the fowl population in a particular area. Multiple fowl retention systems 100 may be used to create a multitude of fowl territories on a particular parcel of land. Increased fowl populations per unit acre may provide an increased yield at harvest, thereby guaranteeing successful hunts.

After the harvest, the unharvested fowl in a covey may remain at the original covey or may split from the covey to establish a new covey at a nearby fowl retention system 100, thereby guaranteeing continued propagation of the fowl.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

I claim:

1. A fowl retention system, comprising:
   a protective structure, wherein a fowl uses the protective structure as a sanctuary and as a shelter, the protective structure, comprising:
      a roof assembly comprising a roof structure and an impervious roof substantially completely covering the roof structure,
      a plurality of uprights that suspend the roof assembly above the ground,
      a horizontal support secured between adjacent uprights and above the roof assembly, wherein the horizontal supports stabilize the adjacent uprights,
      a radial support secured between the ground and either an upright or a horizontal support, wherein the radial supports stabilize the uprights and the horizontal supports,
      a circumferential support secured between all but one of adjacent radial supports thereby creating a web of circumferential supports, whereby the adjacent radial supports without a circumferential support secured thereto provide access to the protective structure,
      a cap support secured to the horizontal supports, and
      a cover placed over the circumferential supports and the cap support;
   a habitat strip disposed near the protective structure, wherein the fowl use the habitat strip for nesting; and
   a station comprising a water supply, wherein the fowl establish a territory around the water supply, and further wherein the fowl utilize the protective structure and the habitat strip such that they do not migrate to another location.

2. The fowl retention system according to claim 1, wherein food items from the habitat strip are the primary source of food for the fowl.

3. The fowl retention system according to claim 1, wherein the fowl also utilize the habitat strip for cover.

4. The fowl retention system according to claim 1, wherein the protective structure further comprises a skirt placed between the ground and at least one side of the roof assembly.

5. The fowl retention system according to claim 1, wherein the cover is a natural vegetative cover.

6. The fowl retention system according to claim 1, wherein the cover is of a man-made material.

7. The fowl retention system according to claim 1, wherein the habitat strip is a plowed and planted portion of earth.

8. The fowl retention system according to claim 7, wherein the habitat strip is planted with native grasses.

9. The fowl retention system according to claim 8, wherein the native grasses produce seeds at varying times of the year such that there is always a supply of food for the fowl.

10. The fowl retention system according to claim 1, wherein the station includes a barrier assembly to keep large animals away from the water supply.

11. The fowl retention system according to claim 10, wherein the barrier assembly further comprises a door panel utilized by an operator during setup and maintenance.

12. The fowl retention system according to claim 11, wherein the barrier assembly permits entry of fowl therethrough and restricts entry of larger animals.

13. The fowl retention system according to claim 11, wherein the barrier assembly further comprises a roof panel to protect components located within the barrier assembly.

14. The fowl retention system according to claim 13, wherein the water supply is housed beneath the roof panel for protection from the elements.

15. The fowl retention system according to claim 10, wherein the water supply is housed within the barrier assembly.

16. The fowl retention system according to claim 1, wherein the water supply comprises:
   a trough;
   a storage tank containing a water; and
   a float valve disposed on the trough and in fluid communication with the storage tank, wherein water disposed in the storage tank flows through the float valve to the trough when the water level in the trough is below the desired level, and further wherein the water does not flow through the float valve when the water level in the trough is at or above the desired level, thereby continuously maintaining the water level in the trough.

17. The fowl retention system according to claim 16, further comprising:
   a stand to support the storage tank and keep the tank elevated above the trough.

18. The fowl retention system according to claim 17, wherein the trough assembly is cantilevered off the front end of the stand assembly such that insects cannot climb to the water in the trough.

19. The fowl retention system according to claim 16, wherein the trough further comprises a ramp disposed in the trough, wherein the fowl that fall into the water exit the water by walking up the ramp.

20. The fowl feeding device according to claim 1, wherein the station further comprises a fowl feeding device.

* * * * *